May 19, 1936.  G. E. LOEHDE  2,041,421
SEAL
Filed March 6, 1933
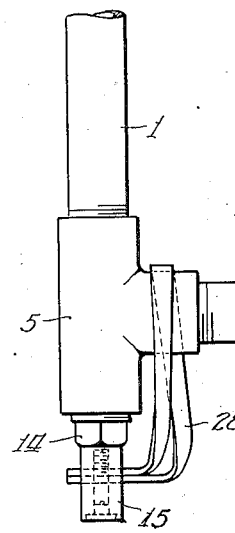
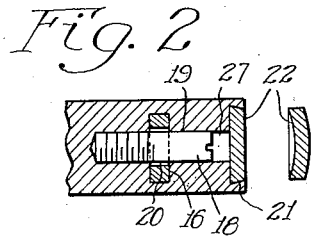
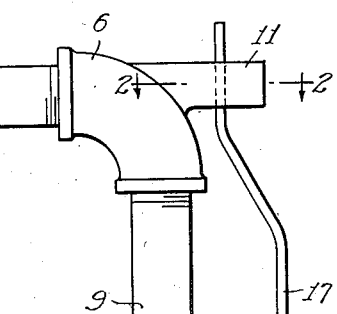
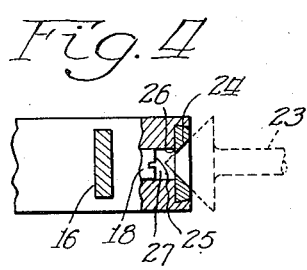
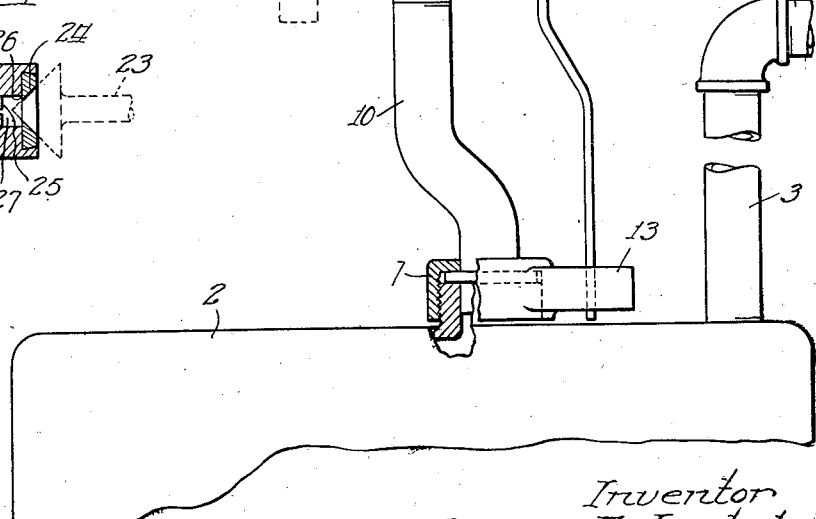
Witness:
V. Siljander
Inventor
George E. Loehde
By:
Hill & Hill
Attys.

Patented May 19, 1936

2,041,421

UNITED STATES PATENT OFFICE 2,041,421

SEAL

George E. Loehde, Chicago, Ill.

Application March 6, 1933, Serial No. 659,830

2 Claims. (Cl. 70—122)

My invention relates generally to locking devices and particularly concerns a type that is adapted to be associated with a plurality of pipe fittings or conduits in a manner to seal and prevent them from being surreptitiously disconnected and reconnected in order that larceny cannot be committed with respect to the fluid passing through the pipe fittings between the meter reader's inspection visits. It is obvious that where a plurality of pipe fittings or conduits are as commonly employed in present practice adjacent a gas, water or other fluid meter, the arrangement is such that it is possible for one to disconnect the pipe fittings in a manner so that a direct communication is provided between the gas supply and the conduit leading to a range or heater, and thus fraudulently obtain a fluid when the usual valve located between the supply conduit and gas or water meter is closed and locked, and to reconnect the same before a return visit of the inspector. My device is particularly designed to avoid such surreptitious disconnection and reconnection between the various pipe fittings and fraudulent use of the fluid.

With the foregoing object in view, I preferably provide each of the various necessary fittings with a fastening means and arrange a tie, band or strap in a manner whereby it is gripped and locked by each fastening means, and I then seal each fastening means in a manner to render them inoperable without destruction of the seal. Thus, if one or more of the fittings has been tampered with, the tie or band will necessarily have to be broken, or if not this, the means employed for sealing the fastening means must need be broken, and therefore, it will be evident that the owner of the fluid supply has a device by which he can detect whether or not larceny of the fluid has been committed or attempted.

A particular object of my invention is to provide a structure in which each of the fastening means above referred to is of a character to simultaneously remove the means for sealing it after a portion of the seal has been removed. The seal preferably consists of a ductile slug or disk which is forcibly seated over the end of a screw which forms part of each fastening means.

Another object of my invention is to provide a device which is durable, simple, consisting of few parts and which may be economically manufactured.

Other objects and advantages of my invention will appear after considering the description hereinafter set forth.

With reference to the drawing annexed hereto,—

Fig. 1 is a view in elevation showing the general arrangement of the fluid supply and the various pipe fittings, including a valve arranged between the fluid supply and meter and the preferred location of the invention applied thereto;

Fig. 2 is an enlarged sectional view taken on line 2—2 of Fig. 1, and particularly discloses the design and construction regarding the fastening means;

Fig. 3 is an enlarged view showing that the means employed for sealing each fastening means may be identified by the owner; and Fig. 4 is an enlarged sectional view similar to Fig. 2 and discloses the manner that may be satisfactorily employed to remove the means for sealing the fastening means.

Considering the several figures or views of the structure disclosed in the drawing, 1 indicates a supply main, 2 a meter, and 3 an outlet and 3' a conduit, leading from outlet 3, and which may be connected to a range, heater or the like, and 4 is the usual valve located between the supply and meter which may be locked closed if desired. Of the various fittings connecting the supply main with the meter, 5 is a T-fitting which is generally employed, 6 an elbow, and 7 a coupling or union fitting. The T-fitting 5 and elbow are connected together by means of a conduit or pipe 8, and 9 is a pipe connecting the elbow 6 with a valve 4, and 10 is a pipe connecting the valve with the meter 2. It will be noted that the coupling fitting or union 7 provides means for coupling and securing one end of the fitting 10 to the meter. The system described is intended to be illustrative; it may be modified as required, but the usual arrangement is similar or the equivalent of that shown.

As above referred to, the primary object of my invention is to prevent unauthorized disconnection of any of the various fittings such as a direct connection between the supply 1 and the conduit 3', and consequent fraudulent use of the fluid passing through the fittings. With this object in view, the elbow fitting 6, valve fitting 4, and the coupling 7 are respectively provided with integral laterally extending lug portions 11, 12, and 13, and a cap plug 14 arranged in the T-fitting 5, is similarly provided with a lug portion 15. Each of the lug portions mentioned is preferably provided with a transverse aperture 16, and a strip, tie or strap 17 is preferably arranged so as to extend through the aperture provided in each lug portion. Each lug portion is provided with a screw element 18 and both provide a means for fastening or otherwise securing the strap or tie to the fittings. Each screw element 18, as clearly shown in Fig. 2, is operable within a bore 19 and is adapted to extend through an aperture 20 provided in the strap or tie and thus the strap is positively locked with respect to the fittings.

A recess 21 which may be of dovetail formation is preferably provided adjacent the end of each lug portion and a seal member or disk 22, preferably of ductile material, is adapted to be forcibly seated within the recess 21, and thus the screw element 18 will be hidden from view and sealed, and before any of the various fittings can be disconnected, it will be necessary to either break the strap 17, or remove the seal 22, whereby one may obtain access to remove the screw element 18. In either case, the owner of the supply will be able to detect whether or not one has committed or attempted larceny of the fluid.

The seal 22 as previously mentioned is preferably made of a ductile material and preferably of a concave design such as that disclosed in Fig. 2 and when forcibly arranged within the recess 21, the seal will be caused to flatten in a manner whereby the same will be held by reason of the dovetail formation of the recess. If the disk fits tightly, a friction fit would suffice to hold the disk without dovetailing. Obviously, the seal may be made of any such other material as beeswax, plaster of Paris, sealing wax or the like.

In the event it is necessary to remove a seal at any time, it may be done in any suitable manner; I have illustrated a possible way by employing a drill such as 23 in the manner shown in Fig. 4 until an aperture 24 of the approximate size shown is formed or of a size which will permit one to insert a blade of a screw driver or key to engage the screw element 18, and upon removing the screw element 18, the end 25 thereof will be caused to engage the portion 26 of the seal and thus cause the central portion of the seal to be positively forced or urged outwardly whereupon the seal will be released. Thus, it will be evident that the screw element 18 which forms part of each fastening means is of a character to also remove the seal after a portion of the seal has been removed by a drill such as 23. The arrangement is such that a space 27 is preferably provided between the end of the screw element and the seal in order that there is sufficient clearance for the end of the drill 23.

The T-fitting 5 as previously mentioned as usually installed, is generally provided with a cap plug 14 and that shown has an integral lug portion 15. The integral lug portion 15 and screw are of the same character as the other lugs and fastening means, however, in the present instance, the cap plug 14 is locked by means of a band or strap 28 which is preferably arranged, as shown, being bent around or locked to the fitting 5 and thus removal of the cap plug is prevented, providing, of course, the strap 28 or the seal 22 has not been broken or removed.

What I claim as new and desire to cover by Letters Patent is:

1. The combination with a pipe section of a pair of fittings respectively threaded on the ends of the section, one of said fittings being an L, a lug on each fitting normal to the pipe section, the lug on said L providing a slot parallel to the pipe section, the lug on the other fitting providing a bore normal to the pipe section and a slot parallel to said section and intersecting said bore, the inner portion of the bore being threaded and its outer end being enlarged to form an outwardly convergent counter-sink, a bar extending through both of said slots and having a hole in register with said bore, a threaded element mounted in said bore and extending through said hole, and a seal for the outer end of said bore.

2. The combination with a pipe section of a pair of fittings respectively threaded on the ends of the section, a lug on each fitting, said lugs providing aligned slots extending parallel to the pipe section, one of said lugs providing a bore normal to the pipe section and intersected by the slot in said lug, the inner portion of the bore being threaded and the outer portion being enlarged to form an outwardly convergent counter-sink, a bar extending through both of said slots and having a hole in register with said bore, a threaded element mounted in said bore and extending through said hole and a seal adapted to be inserted into the counter-sink and spread laterally by the exertion of force thereon.

GEORGE E. LOEHDE.